(12) United States Patent
Jung et al.

(10) Patent No.: US 10,242,031 B2
(45) Date of Patent: Mar. 26, 2019

(54) METHOD FOR PROVIDING VIRTUAL OBJECT AND ELECTRONIC DEVICE THEREFOR

(71) Applicant: Samsung Electronics Co., Ltd., Gyeonggi-do (KR)

(72) Inventors: Jin-He Jung, Gyeonggi-do (KR);
Ji-Hyun Park, Gyeonggi-do (KR);
Kyu-Sung Cho, Gyeonggi-do (KR);
Ik-Hwan Cho, Gyeonggi-do (KR);
Yong-Joon Jeon, Gyeonggi-do (KR);
Min-Kyung Hwang, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 206 days.

(21) Appl. No.: 14/860,992

(22) Filed: Sep. 22, 2015

(65) Prior Publication Data

US 2016/0086381 A1 Mar. 24, 2016

(30) Foreign Application Priority Data

Sep. 23, 2014 (KR) .................... 10-2014-0126591

(51) Int. Cl.
| | |
|---|---|
| *G09G 5/00* | (2006.01) |
| *G06F 17/30* | (2006.01) |
| *G06T 11/00* | (2006.01) |
| *G06K 9/00* | (2006.01) |

(52) U.S. Cl.
CPC .. *G06F 17/30256* (2013.01); *G06F 17/30265* (2013.01); *G06K 9/00671* (2013.01); *G06T 11/00* (2013.01)

(58) Field of Classification Search
None
See application file for complete search history.

(56) References Cited

U.S. PATENT DOCUMENTS

| 7,958,451 B2* | 6/2011 | Ishida ............... G06F 17/30873 707/708 |
| 8,884,988 B1* | 11/2014 | Cho ....................... G06T 19/006 345/633 |
| 9,177,225 B1* | 11/2015 | Cordova-Diba .......... G06T 5/00 |
| 9,235,654 B1* | 1/2016 | Gupta ................. G06F 17/3097 |
| 9,665,882 B2* | 5/2017 | Yehaskel ............ G06Q 30/0247 |
| 2008/0074424 A1* | 3/2008 | Carignano .............. G06T 13/80 345/473 |
| 2008/0133479 A1* | 6/2008 | Zelevinsky ....... G06F 17/30696 |

(Continued)

*Primary Examiner* — Anh-Tuan V Nguyen
(74) *Attorney, Agent, or Firm* — Cha & Reiter, LLC

(57) ABSTRACT

An electronic device and method for providing a virtual object are disclosed, including a processor and memory storing program instructions executable by the processor to implement the method, which includes receiving a request for a virtual object including a plurality of present conditions, searching a database for the virtual object by comparing the received plurality of present conditions to a plurality of condition sets, each set associated with at least one virtual object stored in the database; and when none of the plurality of condition sets matches all of the received plurality of present conditions, detecting a partially matching condition set matching at least one of the received plurality of present conditions and providing a partially matching virtual object corresponding to the partially matching condition set.

20 Claims, 10 Drawing Sheets

(56) References Cited

U.S. PATENT DOCUMENTS

| | | | |
|---|---|---|---|
| 2008/0226119 A1* | 9/2008 | Candelore | G06F 17/30256 382/100 |
| 2008/0270389 A1* | 10/2008 | Jones | G06F 17/30648 |
| 2009/0100035 A1* | 4/2009 | Cradick | G06F 17/30997 |
| 2010/0299332 A1* | 11/2010 | Dassas | G06F 17/245 707/741 |
| 2012/0110031 A1* | 5/2012 | Lahcanski | G06F 17/30241 707/812 |
| 2012/0223966 A1* | 9/2012 | Lim | G06F 3/011 345/633 |
| 2013/0010052 A1* | 1/2013 | Ihara | H04N 7/15 348/14.07 |
| 2013/0088516 A1* | 4/2013 | Ota | G06T 11/00 345/633 |
| 2013/0106910 A1 | 5/2013 | Sacco | |
| 2013/0113827 A1* | 5/2013 | Forutanpour | G06T 3/4038 345/633 |
| 2013/0127907 A1 | 5/2013 | Lee et al. | |
| 2013/0179468 A1* | 7/2013 | Westphal | G06F 17/30985 707/772 |
| 2013/0201216 A1* | 8/2013 | Nakamura | G06T 19/006 345/633 |
| 2013/0201217 A1* | 8/2013 | Morinaga | G06F 3/04815 345/633 |
| 2013/0293586 A1* | 11/2013 | Kaino | G08G 1/005 345/633 |
| 2013/0314442 A1* | 11/2013 | Langlotz | G06T 19/006 345/633 |
| 2014/0028716 A1* | 1/2014 | Yeh | G06T 19/006 345/633 |
| 2014/0125699 A1* | 5/2014 | Lotto | G06T 19/006 345/633 |
| 2014/0267399 A1* | 9/2014 | Zamer | H04L 67/20 345/633 |
| 2014/0333667 A1* | 11/2014 | Jung | G06T 11/00 345/633 |
| 2015/0078667 A1* | 3/2015 | Yun | G06K 9/6201 382/195 |
| 2015/0124106 A1* | 5/2015 | Tomita | G06F 17/30 348/207.1 |
| 2016/0026628 A1* | 1/2016 | Sears | G06F 17/3028 382/199 |

* cited by examiner

| | 501 | 502 | 503 | 504 |
|---|---|---|---|---|
| | FIRST CONDITION | SECOND CONDITION | THIRD CONDITION | VIRTUAL OBJECT |
| | $A_1$ | $B_1$ | $C_1$ | FIRST VIRTUAL OBJECT |
| | $A_2$ | $B_2$ | $C_2$ | SECOND VIRTUAL OBJECT |
| | $A_3$ | $B_3$ | $C_3$ | THIRD VIRTUAL OBJECT |
| | ⋮ | ⋮ | ⋮ | ⋮ |
| | $A_N$ | $B_N$ | $C_N$ | $N^{TH}$ VIRTUAL OBJECT |

FIG.5

METHOD FOR PROVIDING VIRTUAL OBJECT AND ELECTRONIC DEVICE THEREFOR

CLAIM OF PRIORITY

This application claims the priority under 35 U.S.C. § 119(a) to Korean Application Serial No. 10-2014-0126591, which was filed in the Korean Intellectual Property Office on Sep. 23, 2014, the entire content of which is hereby incorporated by reference.

TECHNICAL FIELD

Various embodiments of the present disclosure relate to an electronic device and a method for providing a virtual object in an electronic device.

BACKGROUND

Augmented reality (AR) refers to one type of virtual reality, which involves a combination of the real word combined or overlaid by a virtual world having additional display elements or information. Using this complimenting of the real world with a virtual world, information needed in the real environment may be additionally provided within a virtual environment utilizing generated computer graphics.

Development of mobile devices (e.g. smartphones, tablet PCs, wearable devices, etc.) has expanded the range of augmented reality technology to various services, including education, gaming, navigation, advertising, or blogging.

SUMMARY

Augmented reality involves displaying a virtual object in some relation to a real-world object, with the virtual object providing additional information for the real object. Information related to the virtual object can be displayed in some cases when predetermined conditions are satisfied. When a change occurs to at least one condition for providing or otherwise generating a virtual object (e.g. when a locational position is changed or when an image is changed), in some cases, a desired virtual object fails to be provided or generated.

Various embodiments of the present disclosure may provide an electronic device capable of providing a virtual object, which is overlaid on a real object, in response to a change in present conditions, and a method implementing the same in an electronic device.

In one aspect of this disclosure, a method for providing a virtual object includes receiving a request for a virtual object including a plurality of present conditions, searching a database for the virtual object by comparing the received plurality of present conditions to a plurality of condition sets, each set associated with at least one virtual object stored in the database, and when none of the plurality of condition sets matches all of the received plurality of present conditions, detecting a partially matching condition set matching at least one of the received plurality of present conditions and providing a partially matching virtual object corresponding to the partially matching condition set.

In another aspect of this disclosure, an electronic device for providing a virtual object, including a processor configured to receive a request for the virtual object including a plurality of present conditions, execute a search for the virtual object to by comparing the plurality of present conditions to stored sets of conditions each associated with a stored virtual object, and when no virtual object is associated with a set matching all of the plurality of conditions, detect a partially matching virtual object associated with a set matching at least one condition of the plurality of conditions and provide the partially matching virtual object.

In another aspect of this disclosure, a method for providing a virtual object in an electronic device includes requesting a virtual object by transmitting a plurality of present conditions detected by the electronic device to a server, receiving a virtual object from the server, and generating and displaying the received virtual object as an image on a screen of the electronic device, wherein the received virtual object is a virtual object associated with a set of conditions which matches the plurality of present conditions, and when no virtual object is associated with the set of conditions matching all of the plurality of present conditions, a partially matching virtual object associated with a set of conditions satisfying at least one condition of the plurality of present conditions is received from the server.

In another aspect of this disclosure, a virtual object providing server includes a virtual object registering unit configured to store at least one virtual object for augmented reality and associated with a plurality of conditions, a virtual object requesting unit configured to receive a plurality of present conditions from an electronic device and request a search for a matching virtual object, and an object request processing unit configured to search for the matching virtual object matching the received plurality of present conditions from among a plurality of stored virtual objects, and when no virtual object satisfies all of the received plurality of present conditions, transmit to the electronic device a partially matching virtual object which matches at least one of the received plurality of present conditions.

According to various embodiments of the present disclosure, when a plurality of present conditions is received and compared to sets of stored conditions to detect a matching virtual object, and not virtual object matches all of the plurality of present conditions, a partially matching virtual object can be displayed on the basis of matching some of the plurality of present conditions, thereby providing the client with more diversified pieces of information.

In addition, according to various embodiments of the present disclosure, when some conditions among complex conditions for displaying a virtual object are satisfied, an individualized service can be provided on the basis of the satisfied conditions.

BRIEF DESCRIPTION OF THE DRAWINGS

The present disclosure will be more apparent from the following detailed description taken in conjunction with the accompanying drawings, in which:

FIG. 5 is a diagram illustrating virtual objects registered in a database according to various embodiments of the present disclosure;

DETAILED DESCRIPTION

Figure 1:
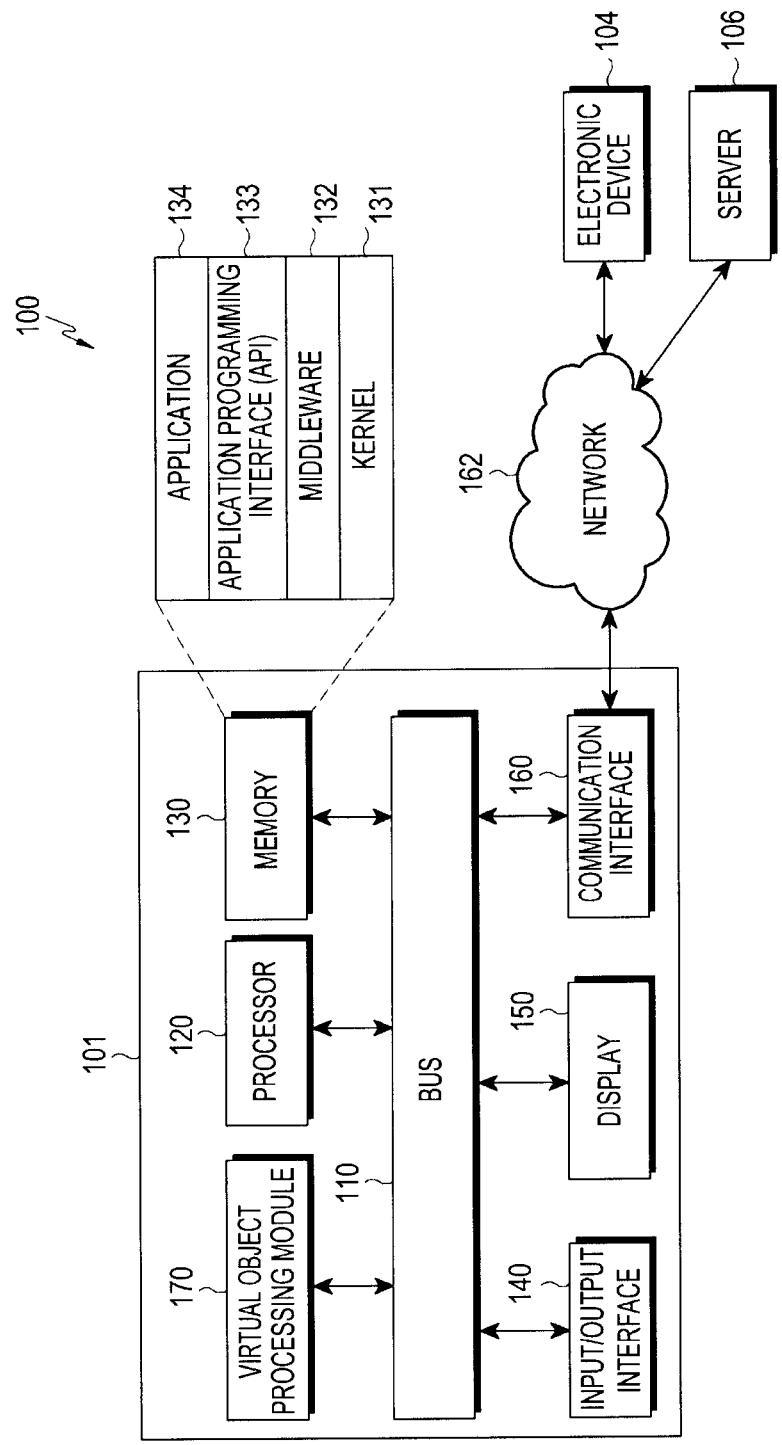
FIG. 1 illustrates a network environment including an electric device according to various embodiments of the present disclosure.

Hereinafter, the present disclosure will be described with reference to the accompanying drawings. The present disclosure may have various embodiments, and modifications and changes may be made therein. Therefore, the present disclosure will be described in conjunction with particular embodiments shown in the accompanying drawings. However, it should be understood that there is no intent to limit the present disclosure to the particular forms disclosed herein; rather, the present disclosure should be construed to cover all modifications, equivalents, and/or alternatives falling within the ambit of the disclosure. In the description of the drawings, identical or similar reference numerals are used to designate identical or similar elements.

In the present disclosure, the expression "include" or "may include" refers to existence of a corresponding function, operation, or element, and does not limit one or more additional functions, operations, or elements. Also, as used herein, the terms "include" and/or "have" should be construed to denote a certain feature, number, step, operation, element, component or a combination thereof, and should not be construed to exclude the existence or possible addition of one or more other features, numbers, steps, operations, elements, components, or combinations thereof.

In the present disclosure, the expression "or" includes any or all combinations of words enumerated together. For example, the expression "A or B" may include A, may include B, or may include both A and B. For example, the expression "A or B" may include A, may include B, or may include both A and B.

Although the expressions such as "first" and "second" in the present disclosure can modify various constituent elements of the present disclosure, they do not limit the constituent elements. For example, the above expressions do not limit the sequence and/or importance of the corresponding elements. The above expressions may be used merely for the purpose of distinguishing one element from the other elements. For example, a first user device and a second user device indicate different user devices although both of them are user devices. For example, a first element may be termed a second element, and similarly, a second element may be termed a first element without departing from the scope of the present disclosure.

When an element is referred to as being "coupled" or "connected" to any other element, it should be understood that not only the element may be directly couple4d or connected to the other element, but also a third element may be interposed therebetween. Contrarily, when an element is referred to as being "directly coupled" or "directly connected" to any other element, it should be understood that no element is interposed therebetween.

The terms used herein are used only to describe particular embodiments, and are not intended to limit the present disclosure. As used herein, the singular forms may include the plural forms as well, unless the context clearly indicates otherwise.

Unless defined otherwise, all terms used herein, including technical and scientific terms, have the same meaning as those commonly understood by a person of ordinary skill in the art to which the present disclosure pertains. Such terms as those defined in a generally used dictionary are to be interpreted to have the meaning equal to the contextual meaning in the relevant field of art, and are not to be interpreted to have ideal or excessively formal meaning unless clearly defined in the present disclosure.

An electronic device according to the present disclosure may be, but is not limited to, a device including a communication function. The entity, for example, may include at least one of a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, or a wearable device (e.g., a head-mounted-device (HMD) such as electronic glasses, electronic clothes, an electronic bracelet, an electronic necklace, an electronic appcessory, an electronic tattoo, or a smartwatch).

According to some embodiments, the electronic device may be a smart home appliance with a communication function. The smart home appliance as an example of the electronic device may include at least one of, for example, a television, a Digital Video Disk (DVD) player, an audio system, a refrigerator, an air conditioner, a vacuum cleaner, an oven, a microwave oven, a washing machine, an air cleaner, a set-top box, a TV box (e.g., Samsung Home-Sync™, Apple TV™, or Google TV™), a game console, an electronic dictionary, an electronic key, a camcorder, or an electronic picture frame.

According to some embodiments, the entity may include at least one of various medical appliances (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), an in-vehicle infotainment device, electronic equipment for ships (e.g., ship navigation equipment and a gyrocompass), avionics, security equipment, a vehicle head unit, an industrial or home robot, an automatic teller machine (ATM) of a banking system, or a point of sales (POS) of a store.

According to some embodiments, the electronic device may include at least one of a part of furniture or a building/structure having a communication function, an electronic board, an electronic signature receiving device, a projector, and various kinds of measuring instruments (e.g., a water meter, an electric meter, a gas meter, a radio wave meter, and the like). The electronic device according to the present disclosure may be a combination of one or more of the aforementioned various devices. Also, the electronic device according to the present disclosure may be a flexible device.

Further, it is obvious to those skilled in the art that the electronic device according to the present disclosure is not limited to the aforementioned devices.

Various embodiments of the present disclosure provide an electronic device for providing a virtual object added to a real object to implement augmented reality, a method for providing a virtual object, etc. According to various embodiments of the present disclosure, a virtual object can be provided on the basis of at least one condition satisfied, even when some of complex conditions for providing a virtual object are not satisfied.

In the following description, a "virtual object" refers to information generated to correspond to a real recognition object in terms of at least one condition, and the corresponding information can be activated under the same condition and provided to the client. For example, the virtual object can be implemented in any type, such as a text, an image, a moving image, an animation, a sound, a background, a word balloon, a map, a figure, etc. In addition, when at least one of a plurality of conditions corresponding to the virtual object according to various embodiments of the present disclosure has been changed, the corresponding virtual object is referred to as a "partially matching virtual object (which may also be referred to as a ghost clue for the sake of convenience, for example)".

According to various embodiments of the present disclosure, when there exist conditions satisfied, among a plurality of conditions corresponding to a virtual object, other than conditions changed, the virtual object may also be provided in a different type of information according to various embodiments described later. For example, according to various embodiments of the present disclosure, even when some of complex conditions for providing a virtual object are changed, the virtual object can be displayed in the existing type or in a changed type on the basis of the remaining conditions unchanged. In addition, even when some conditions described above are changed, a part of the virtual object, which satisfies the conditions prior to change, may also be provided.

Conditions for generating or requesting a virtual object according to various embodiments of the present disclosure may include the geographical position of an electronic device that displays the virtual object, the aiming direction, the aiming range, the aiming target, the aiming time, the degree of exposure to a different client, environmental conditions such as weather, client gestures, etc., but conditions according to embodiments of the present disclosure are not limited thereto. The kind of conditions for generating or requesting a virtual object may be set by the system in advance or set by the client's selection.

It will be assumed in the following description of various embodiments of the present disclosure, to aid understanding, that the virtual object or condition is mainly an image or a picture, but embodiments of the present disclosure are not limited to the image or picture, but may include all conditions which can be recognized by the device or which are directly inputted by the client, such as an image, a picture, a sound, a smell, a touch, a temperature, a position, etc., as described above.

Hereinafter, the structure of a device according to various embodiments of the present disclosure will be described with reference to FIGS. 1 and 2, and a procedure according to various embodiments of the present disclosure will then be described in detail with reference to FIGS. 3 and 4.

First, an electronic device according to various embodiments will be described with reference to the accompanying drawings. The term "client" used in the various embodiments may refer to a person or a device using the electronic device.

FIG. 1 illustrates a network environment 100 including an electronic device 101 according to various embodiments. Referring to FIG. 1, the electronic device 101 may include at least one from among a bus 110, a processor 120, a memory 130, an input/output interface 140, a display 150, a communication interface 160, and a virtual object processing module 170.

The bus 110 may be a circuit configured to connect the above-described components with one another and to transfer a communication (for example, control messages) among the above-described components.

The processor 120 may receive instructions from other components described above (for example, the memory 130, the input/output interface 140, the display 150, the communication interface 160, the virtual object processing module 170 or the like) through, for example, the bus 110, then decode the received instructions and perform calculation or data processing according to the decoded instructions. In addition, the processor 120 may include all or part of the functions of the virtual object processing module 170. For example, functions according to various embodiments of the present disclosure may be processed by the virtual object processing module 170, may be processed by the processor 120, or may be processed by interworking between the virtual object processing module 170 and the processor 120.

The memory 130 may store commands or data received from or generated by the processor 120 or other components (for example, the input/output interface 140, the display 150, the communication interface 160, or the virtual object processing module 170). The memory 130 may include programming modules, for example, a kernel 131, a middleware 132, an Application Programming Interface (API) 133, or an application 134. Each of the programming modules described above may be configured by software, firmware, and hardware, or a combination of at least two thereof.

The kernel 131 may control or manage system resources (for example, the bus 110, the processor 120, the memory 130, or the like) which are used in performing operations or functions implemented by the remaining programming modules, for example, the middleware 132, the API 133 or the application 134. Furthermore, the kernel 131 may provide an interface through which the middleware 132, the API 133, or the application 134 may access individual components of the electronic device 101 to control or manage them.

The middleware 132 may perform a relay function to allow the API 133 or the application 134 to communicate with the kernel 131 to exchange data. Further, in relation to requests for an operation received from the application 134, the middleware 132 may control (e.g., a scheduling or a load-balancing) the requests by using, for example, a method of determining a sequence for using system resources (e.g., the bus 110, the processor 120, the memory 130, or the like) of the electronic device 101 with respect to at least one application among the applications 134.

The API 133 is an interface by which the application 134 controls functions provided from the kernel 131 or the middleware 132, and may include, for example, at least one interface or function (for example, instructions) for a file control, a window control, an image processing, a text control, or the like.

According to various embodiments, the application 134 may include a SMS/MMS application, an email application, a calendar application, an alarm application, a health care application (for example, application measuring a quantity of exercise or blood sugar) or an environment information application (for example, application providing information on atmospheric pressure, humidity or temperature). Additionally or alternatively, the application 134 may be an application related to the exchange of information between the electronic device 101 and an external electronic device (for example, an electronic device 104). The application related to the information exchange may include, for example, a notification relay application for transferring particular information to the external electronic device or a device management application for managing the external electronic device.

For example, the notification relay application may include a function of transmitting notification information generated by another application (for example, the SMS/MMS application, the email application, the health care application or the environment information application) of the electronic device 101 to the external electronic device (for example, the electronic device 104). Additionally or alternatively, the notification relay application may receive notification information from, for example, an external electronic device (for example, the electronic device 104), and provide the same to a client. The device management application, for example, may manage (for example, install, delete, or update) at least some functions (for example, turning external electronic device (or some components) on or off or adjusting the brightness (or resolution) of a display) of an external electronic device (for example, the electronic device 104) that communicates with the electronic device 101, applications performed in the external electronic device, or services (for example, a phone call service, or a messaging service) provided by the external electronic device.

According to various embodiments, the application 134 may include an application designated according to a property (e.g., a kind of the electronic device) of the external electronic device (e.g., the electronic device 104). For example, in a case where the external electronic device is an MP3 player, the application 134 may include an application related to the reproduction of music. Similarly, when the external electronic device is a mobile medical device, the application 134 may include an application related to the health care. According to an embodiment, the application 134 may include at least one of an application designated to the electronic device 101 and an application received from an external electronic device (for example, a server 106 or the electronic device 104).

The input/output interface 140 may transmit a command or data input from the client through an input/output device (for example, sensor, keyboard, or touch screen) to the processor 120, the memory 130, the communication interface 160, or the virtual object processing module 170 through, for example, the bus 110. For example, the input/output interface 140 may provide, to the processor 120, data regarding the client's touch which is input through the touch screen. In addition, the input/output interface 140 may output instructions or data received from the processor 120, the memory 130, the communication interface 160, or the virtual object processing module 170 through the bus 110, for example, through the input/output device (e.g., speaker or display). For example, the input/output interface 140 may output voice data processed by the processor 120 to the client through the speaker.

The display 150 may display various pieces of information (for example, multimedia data or text data) to the client.

The communication interface 160 may connect communication between the electronic device 101 and the external device (for example, the electronic device 104 or the server 106). For example, the communication interface 160 may be connected with a network 162 through wireless communication or wired communication to communicate with the external electronic device. The wireless communication may include at least one of, for example, a Wireless Fidelity (Wi-Fi), a Bluetooth (BT), a Near Field Communication (NFC), a Global Positioning System (GPS) or a cellular communication (for example, LTE, LTE-A, CDMA, WCDMA, UMTS, WiBro, GSM or the like). The wired communication may include at least one of, for example, Universal Serial Bus (USB), High Definition Multimedia Interface (HDMI), Recommended Standard 232 (RS-232), or Plain Old Telephone Service (POTS).

According to an embodiment, the network 162 may be a telecommunications network. The telecommunications network may include at least one of a computer network, the Internet, the Internet of things, and a telephone network. According to an embodiment, a protocol (for example, a transport layer protocol, a data link layer protocol, or a physical layer protocol) for the communication between the electronic device 101 and the external device may be supported by at least one of the application 134, the application programming interface 133, the middleware 132, the kernel 131, and the communication interface 160.

The electronic device 101 is illustrated in FIG. 1 as including the communication interface 160 to communicate with the external electronic device 104, the server 106, or the like through the network 162; however, according to another embodiment of the present disclosure, the electronic device 101 may be implemented to operate independently in the electronic device 101 without a separate additional communication function.

According to various embodiments of the present disclosure, the virtual object processing module 170 may process at least a part of information acquired from other components (e.g. the processor 120, the memory 130, the input/output interface 140, the communication interface 160, on the like) according to various embodiments of the present disclosure and provide the client with the same in various methods. For example, the electronic device 101 may store a specific object as a virtual object in conformity with at least one condition and, when at least one pre-stored condition is received, may output a virtual object, among the stored virtual objects, which conforms to the received condition. In addition, the virtual object may be added to a real image, which is being watched by the client, and displayed on one screen so that additional information regarding the real environment is provided through the virtual object. Additional information regarding the virtual object processing module 170 is provided below with reference to FIG. 2.

Figure 2:
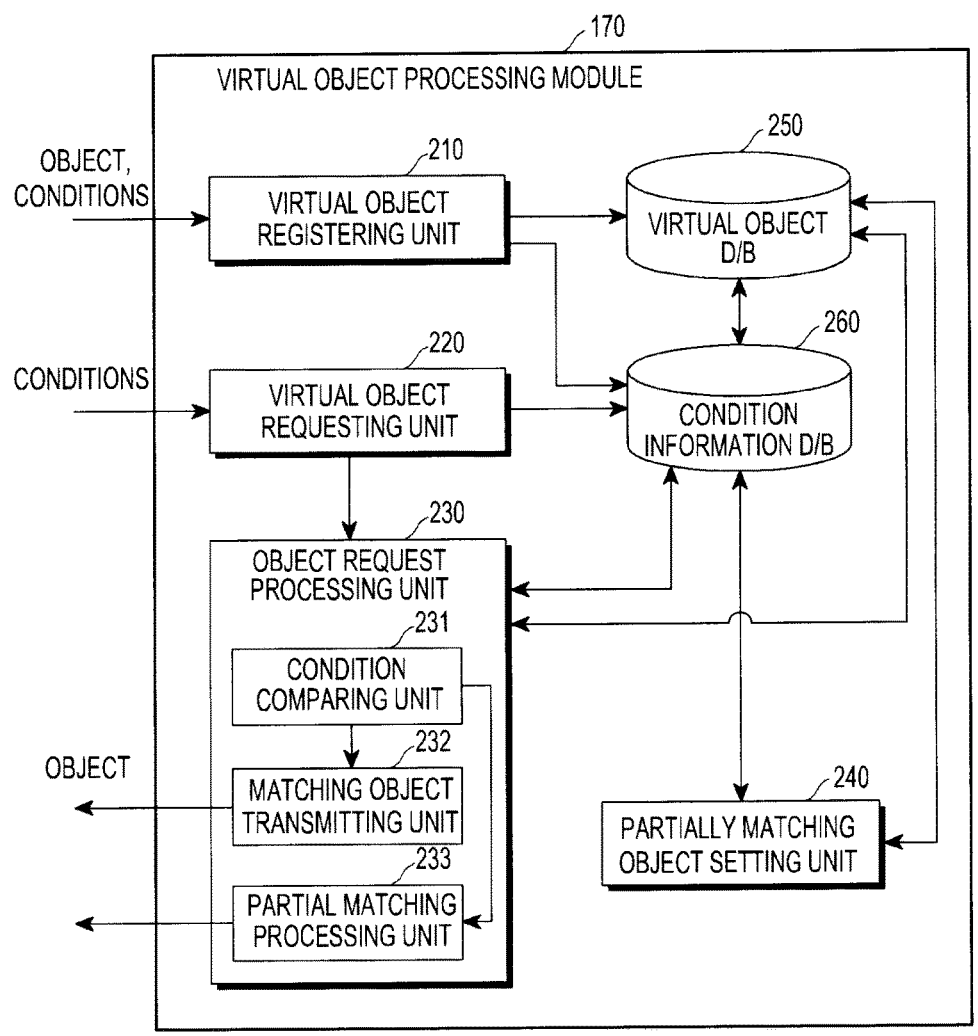
FIG. 2 illustrates a block diagram regarding an electric device according to various embodiments of the present disclosure.

FIG. 2 is a block diagram of a virtual object processing module 170 of an electronic device (e.g., electronic device 101) according to various embodiments of the present disclosure.

The virtual object processing module 170 as depicted may include, for example, a virtual object registering unit 210, a virtual object requesting unit 220, an object request processing unit 230, and a partially matching virtual object setting unit 240. In addition, according to an embodiment of the present disclosure, the virtual object processing module 170 may further include one or more databases, such as the a virtual object database 250 and a condition information database 260.

The virtual object registering unit 210 may store at least one virtual object to be generated within an augmented reality environment when a given plurality of conditions is satisfied in a database. Each of the virtual objects to be registered may be stored in the virtual object database 250 accompanied by a plurality of conditions (e.g., two or more conditions) designated thereto. According to various embodiments of the present disclosure, the plurality of conditions for each virtual object may also be separately stored in the condition information database 260 and managed so as to set or define partially matching virtual objects. According to various embodiments of the present disclosure, at least one of the virtual object, the partially matching virtual object, and the condition information may be data set (or customized) for individual users, and the data may be thus used to generate a virtual object or a partially matching virtual object when conditions registered for each individual are detected, thereby facilitating a personally customized augmented reality service.

The virtual object registering unit 210 may receive and register a corresponding virtual object and an attendant plurality of conditions in response to a request for registering a virtual object.

The virtual object requesting unit 220 may receive a plurality of conditions and, when a virtual object matching the plurality of conditions is requested, transmit a request for the matching virtual object to the object request processing unit 230. The plurality of conditions requested may be stored in the condition information database 260.

The object request processing unit 230 may include a condition comparing unit 231, a matching object transmitting unit 232, a partial matching processing unit 233, etc. The condition comparing unit 231 compares conditions, the conditions having been received according to the request for a virtual object through the virtual object requesting unit 220. The conditions are compared with a plurality of conditions corresponding to each virtual object stored in the virtual object database 250.

The matching object transmitting unit 232 transmits the matching virtual object which is a virtual objecting having all associated conditions of coinciding with the received conditions, as detected by comparison via the condition comparing unit 231.

In some cases, no fully matching virtual object is detected. That is, there is no virtual object having all associated conditions coinciding with the received plurality of conditions in the virtual object database 250, as detected by the comparison executed by the condition comparing unit 231. In these cases, it may be determined whether a virtual object exists which satisfies at least one condition. When a virtual object satisfying at least one condition is determined to exist, the partially matching processing unit 233 may output the detected object as a partially matching virtual object according to various embodiments of the present disclosure. In addition, when the plurality of conditions received satisfy a preset or predefined partially matching condition, preset partially matching processing may be performed according to another embodiment of the present disclosure. Other embodiments directed to this concept will be described further below.

As described above, the partially matching virtual object setting unit 240 may set a virtual object as a partially matching virtual object when it satisfies at least one specific condition (rather than the full set of specific conditions). In one example, having a specific non-coinciding condition are repeated over a predetermined period of time, these conditions being among a plurality of conditions matching with a respective plurality of virtual objects stored in the virtual object database 250. The corresponding virtual object may then be set as a partially matching virtual object. Accordingly, when the plurality of conditions received satisfy the set partially matching condition of the partially matching virtual object, the partially matching processing unit 233 may output or transmit the corresponding partially matching virtual object.

Accordingly, even when a specific condition is changed (e.g., change of a position or an image, among a plurality of conditions) so that no virtual object exists which satisfies the full set of conditions, the electronic device 101 may thus provide a related virtual object as a partially matching virtual object, thereby preserving the ability to present a diversified range of information.

According to an embodiment of the present disclosure, the display 150 in FIG. 1 may therefore display the result of processing by the virtual object processing module 170 or the processor 120 on the screen. For example, according to one embodiment of the present disclosure, a virtual object or a partially matching virtual object, which was received from the virtual object processing module 170, may be overlaid or otherwise combined with a real image, which is seen by the client (e.g., user) through the display 150, and displayed together on the single display 150, so that information regarding the real environment is displayed to the client via the displayed virtual object.

Although the virtual object processing module 170 is illustrated in FIG. 1 as a separate module from the processor 120, at least some of the functions or functional units of the virtual object processing module 170 may be included and/or implemented by or within the processor 120. In addition, all or some functions of the virtual object processing module 170 may be included and implemented within the processor 120 or another module (e.g., camera module). According to various embodiments of the present disclosure, all or some functions constituting the virtual object processing module 170 may be configured in a separate electronic device or a server, which is connected via a network.

For example, when an image is taken by a camera module (corresponding to the camera module 1291 in FIG. 12) provided on the electronic device 101, an object recognized from the captured image may be compared and matched with a virtual object, thereby facilitating implementation of augmented reality. The virtual object to be generated, in this case, may be an object stored in the electronic device 101, as described above, or an object received from an external server 106 (e.g., the virtual object providing server 1020 in FIG. 10) via a network 162 at a request of the electronic device 101.

For example, at least one real object is recognized from an image taken by the electronic device 101, and a plurality of conditions (e.g., the geographical position of the electronic device 101, the aiming direction, the aiming range, the aiming target, the aiming time, the degree of exposure to a different client, environmental conditions such as weather, client gestures, etc.) are transmitted to the virtual object processing module 170 inside the electronic device 101 to request a virtual object, or the plurality of conditions are transmitted to the external server 106 via the network 162 to request a virtual object; then, the virtual object processing module 170 or the server 106 may search the database for a virtual object matching with the plurality of conditions and provide the virtual object found. The electronic device 101 may match (image synthesis or image overlay) the virtual object, which has been provided by the virtual object processing module 170 or the server 106, with the currently taken image, thereby displaying augmented reality.

When there exists no virtual object, which matches with the plurality of conditions, in the virtual object processing module 170 or the server 106, no virtual object could be provided. However, according to various embodiments of the present disclosure, a virtual object matching with at least one of the plurality of conditions is provided, thereby providing the client with various useful information.

Each function unit or module, as used in embodiments of the present disclosure, may refer to a functional or structural combination of hardware for performing the technical idea of the embodiments of the present disclosure and software for driving the hardware. A person skilled in the art, to which embodiments of the present disclosure pertain, could easily understand that each function unit or module, described above, may refer to a predetermined code and a logical unit of a hardware resource for executing the predetermined code, for example, and does not necessarily mean either a physically connected code or one kind of hardware.

An electronic device for providing a virtual object according to one of various embodiments of the present disclosure may include: a virtual object requesting unit configured to request a search for a virtual object corresponding to a plurality of conditions; and an object request processing unit configured to search for a virtual object, which satisfies the plurality of conditions, from among at least one virtual object and, when no virtual object exists that satisfies the plurality of conditions, provide a virtual object that satisfies at least one of the plurality of conditions.

According to various embodiments, the electronic device may further include a virtual object registering unit configured to store at least one virtual object in conformity with a plurality of conditions.

According to various embodiments, the electronic device may further include a display configured to synthesize the virtual object with an image, which is being displayed on the screen, and display the result of synthesis.

According to various embodiments, the object request processing unit may include a condition comparing unit configured to compare the plurality of conditions with a plurality of conditions corresponding to a stored virtual object; and a partially matching virtual object setting unit configured to determine, when at least one condition does not coincide as a result of the comparison, whether the non-coinciding condition persists or not and, when it is determined as a result of the determination that the non-coinciding condition has persisted at least for a preset period of time, register at least one coinciding condition from among the plurality of conditions, in connection with which the non-coinciding condition has persisted, as a partially matching condition; and the object request processing unit may provide the virtual object when the plurality of conditions satisfy the partially matching condition.

According to various embodiments, when the non-coinciding condition is an image, the object request processing unit may process so that the virtual object is displayed at a changed part of the image displayed on the screen of the electronic device.

According to various embodiments, the virtual object may be at least one selected from among a still image, a moving image, a sound, a smell, a touch, a temperature, and a position.

According to various embodiments, the condition may be at least one selected from among the geographical position of the electronic device, the aiming direction of a camera of the electronic device, the aiming range of the camera, the aiming target of the camera, the aiming time of the camera, the degree of exposure to a different client of the camera, weather in the environment of the electronic device, and a client gesture as detected by the electronic device.

Figure 3:
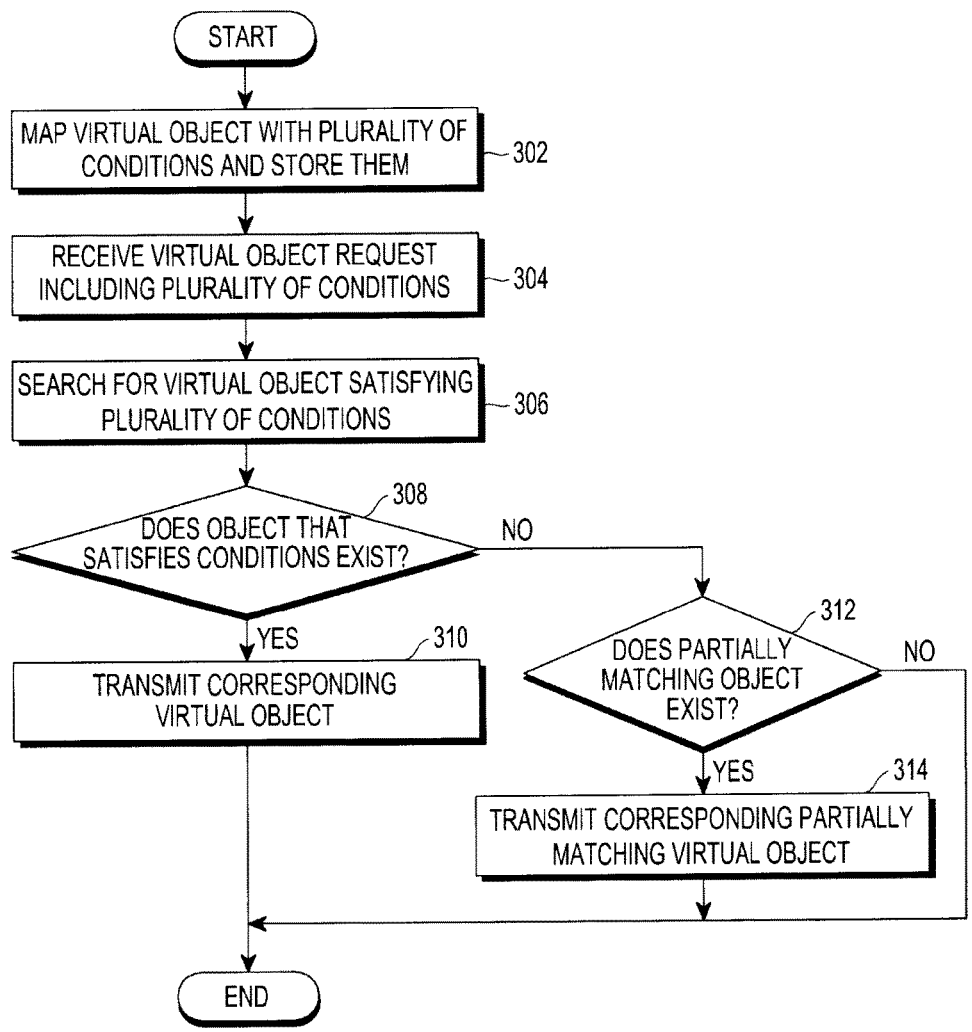
FIG. 3 is a flowchart illustrating a virtual object providing procedure according to various embodiments of the present disclosure.

FIG. 3 is a flowchart illustrating a virtual object generation procedure according to various embodiments of the present disclosure. Referring to FIG. 3, a virtual object is stored and associated with a plurality of conditions in operation 302. A virtual object request for implementing augmented reality is received in operation 304, which may include a plurality of conditions to be matched, as described below A virtual object conforming to the corresponding condition may thus be provided according to various embodiments of the present disclosure.

The virtual object request can be a transmission including, for example a plurality of conditions. When the request is received, a virtual object satisfying (e.g., matching) all the plurality of conditions can be searched for in operation 306, thereby providing an object satisfying the transmitted plurality of conditions. In operation 308, when an object is detected satisfying all of the plurality of conditions as a result of the search, the corresponding virtual object found can be transmitted in operation 310.

According to various embodiments of the present disclosure, in operation 308, when no object exists that satisfies all of the plurality of conditions as a result of the search, a search for a partially matching virtual object can be made in operation 312 according to various embodiments of the present disclosure. When a partially matching virtual object exists as a result of the search, the corresponding partially matching virtual object can be transmitted in operation 314.

According to various embodiments of the present disclosure, a plurality of conditions corresponding to the virtual object or a plurality of conditions transmitted to request the virtual object may include various conditions. For example, the plurality of conditions may include, as described above, the geographical position of an electronic device that displays the virtual object, the aiming direction, the aiming range, the aiming target, the aiming time, the degree of exposure to a different client, environmental conditions such as weather, client gestures, etc., but conditions according to embodiments are not limited thereto.

For example, when a real image is taken through a camera module provided on the electronic device, information may be recognized from the taken image, or various types of information sensed at the image-taking time may be extracted, thereby generating condition information. In addition, for example, recognition information recognized from the taken image may be information regarding the kind of object recognized from the taken image (e.g., barcode, QR code, wine label, physical body, human body, face, etc.), may be information regarding an image of at least a part, including an area of the object recognized from the taken image, or may be information regarding analysis of the object recognized from the taken image (e.g., barcode identification information, QR code analysis information, feature point information (descriptor, etc.).

Meanwhile, setting or change regarding a plurality of conditions for generating the virtual object may be made inside the electronic device or made inside the server. In addition, setting or change regarding conditions for generating the virtual object may be made by the server manager, the service manager, or the client.

Figure 4:
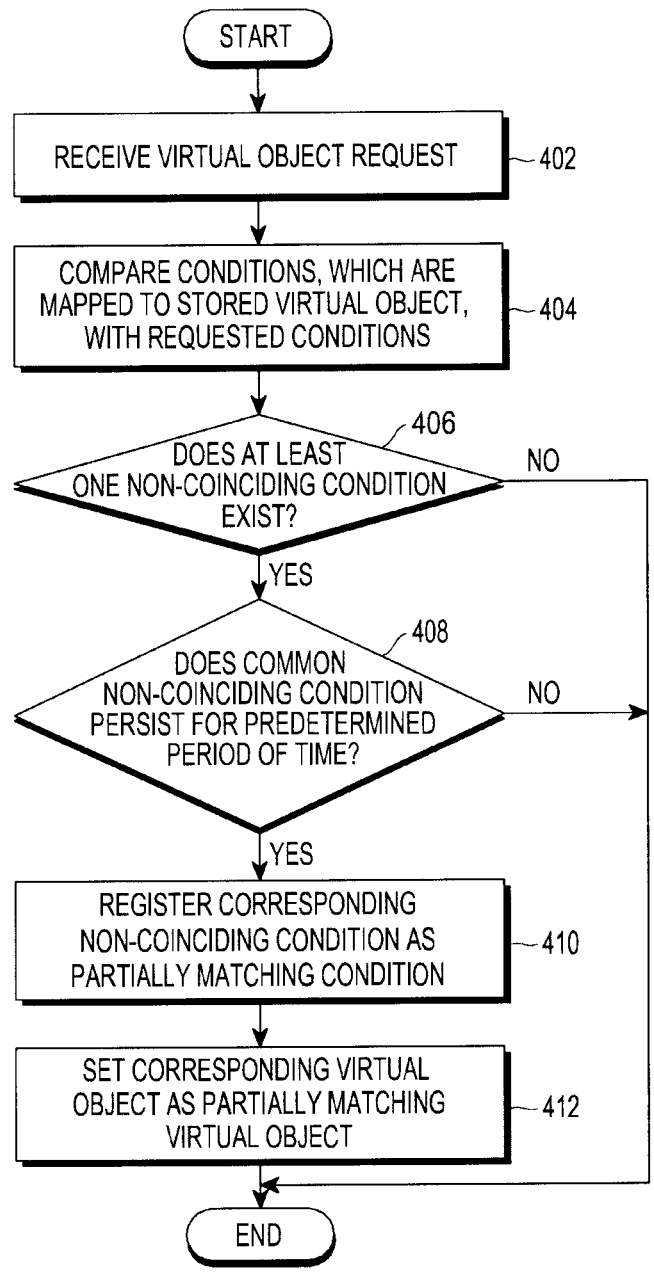
FIG. 4 is a flowchart illustrating a partially matching virtual object setting procedure according to various embodiments of the present disclosure.

FIG. 4 is a flowchart illustrating a procedure for configuring (e.g. setting) a partially matching virtual object according to various embodiments of the present disclosure. Referring to FIG. 4, a virtual object request is received in operation 402. A search may be conducted for a matching virtual object which matches the plurality of corresponding conditions. Alternatively, a search may be conducted for a partially matching virtual object and provided (as illustrated in FIG. 3). Similarly, a partially matching virtual object may be set by analyzing the plurality of received conditions according to various embodiments of the invention.

For example, in operation 404, a plurality of conditions attending or received with the received virtual object request may be compared with a plurality of conditions corresponding to a stored virtual object; and, when at least one non-coinciding condition exists in operation 406, it is determined whether the non-coinciding condition persists for a predetermined period of time. For example, when it is determined in operation 408 that the non-coinciding condition as described above has persisted for the predetermined period of time (that is, at least one coinciding condition from among a plurality of conditions, in connection with which the non-coinciding condition has persisted), it may be registered as a partially matching condition in operation 410. In addition, a virtual object corresponding to the partially matching condition may be set as a partially matching virtual object in operation 412. Accordingly, when a virtual object satisfies the condition registered as a partially matching condition, the virtual object may be provided as a partially matching virtual object.

In one example, it will be assumed that a plurality of conditions are generated regarding a position, a aiming point, and a target (e.g., image), and, at the request of a virtual object, the corresponding virtual object cannot be provided because conditions regarding the position and the aiming point are satisfied, while the target condition is not satisfied. Then, the partially coinciding conditions may be determined sufficient as partially matching conditions, and a partially matching virtual object may be retrieved and transmitted (or generated) because of the matching of at least one of the matching (or coinciding) conditions.

It will be assumed, as another example, that a plurality of conditions are generated regarding the position, the aiming point, and the target (e.g., image), and, at the request of a virtual object, the corresponding virtual object cannot be provided because conditions regarding the aiming point and the target are satisfied, while the position condition is not satisfied; then, the partially coinciding conditions may be determined as partially matching conditions, and a partially matching virtual object may be set on the basis of at least one of the remaining conditions that coincide.

The method for providing a virtual object according to an embodiment of the present disclosure may be implemented in the form of a program command which can be executed through various computer means and be stored in a computer-readable medium. The computer readable medium may include a program command, a data file, a data structure, and the like independently or in combination. The program command recorded in the medium may be things specially designed and configured for the present disclosure, or things that are well known to and can be used by those skilled in the computer software related art. An example of the computer-readable recording medium includes magnetic media such as a hard disc, a floppy disc and a magnetic tape, optical media such as a CD-ROM and a DVD, magneto-optical media such as a floptical disc, and a hardware device, such as a ROM, a RAM, a flash memory, which is specially designed to store and perform the program instruction. Examples of the program command include a machine language code generated by a compiler and a high-level language code executable by a computer through an interpreter and the like. The hardware devices may be configured to operate as one or more software modules to perform the operations of the present disclosure, and vice versa.

A method for providing a virtual object according to one of various embodiments of the present disclosure may include the operations of: confirming a plurality of conditions by an electronic device; searching for a virtual object, which satisfies the plurality of conditions, from among at least one virtual object by the electronic device; and providing a virtual object, which satisfies at least one of the plurality of conditions, by the electronic device when no virtual objects exists that satisfies the plurality of conditions as a result of the search.

According to various embodiments, the method may further include an operation of storing at least one virtual object so as to correspond to a plurality of conditions.

According to various embodiments, the operation of providing a virtual object may include an operation of synthesizing the virtual object with an image displayed on the screen and displaying the result of synthesis.

According to various embodiments, the method may further include the operations of: comparing the plurality of conditions with a plurality of conditions corresponding to the virtual object; determining, when at least one condition does not coincide as a result of the comparison, whether the non-coinciding condition persists or not; registering at least one coinciding condition as a partially matching condition, when it is determined as a result of the determination that the non-coinciding condition has persisted at least a preset period of time, from among a plurality of conditions, in connection with which the non-coinciding condition has persisted; and providing the virtual object when the plurality of conditions satisfy the partially matching condition.

According to various embodiments, the method may include the operations of: providing an image-type virtual object when the non-coinciding condition is an image; and displaying the virtual object at a changed portion of the image displayed on the screen.

According to various embodiments, the virtual object may be at least one selected from among a still image, a moving image, a sound, a smell, a touch, a temperature, and a position.

According to various embodiments, the condition may be at least one selected from among the geographical position of the electronic device, the aiming direction, the aiming range, the aiming target, the aiming time, the degree of exposure to a different client, weather, and a client gesture.

A method for providing a virtual object in an electronic device according to one of various embodiments of the present disclosure may include the operations of: requesting a virtual object by transmitting a plurality of conditions to a server; receiving a virtual object from the server; and synthesizing the received virtual object with an image displayed on the screen and displaying the result of synthesis, and the virtual object received from the server may be a virtual object, which satisfies the plurality of conditions received from the electronic device, from among virtual objects stored in a database of the server, or may be a virtual object that satisfies at least one of the plurality of conditions received when no virtual object exists that satisfies all of the plurality of conditions received as a result of searching through virtual objects stored in the database.

According to various embodiments, the virtual object may be at least one selected from among a still image, a moving image, a sound, a smell, a touch, a temperature, and a position.

According to various embodiments, the condition may be at least one selected from among the geographical position of the electronic device, the aiming direction, the aiming range, the aiming target, the aiming time, the degree of exposure to a different client, weather, and a client gesture.

Hereinafter, examples of virtual objects and partially matching virtual objects, which are registered in a database, will be described with reference to FIG. 5 and FIG. 6. Examples of virtual objects or partially matching virtual objects described below are specific examples for the purpose of aiding understanding of various embodiments, and may be modified and implemented in various methods. For example, the kind of conditions, the number of matching conditions, conditions for setting a partially matching virtual object, etc. may be variously modified and implemented.

FIG. 5 is a diagram illustrating virtual objects registered in a database according to various embodiments of the present disclosure. Referring to FIG. 5, a plurality of conditions (e.g., three conditions including a first condition 501, a second condition 502, and a third condition 503 in FIG. 5) may be stored and each set associated to each of a number of virtual object 504.

Figure 7:
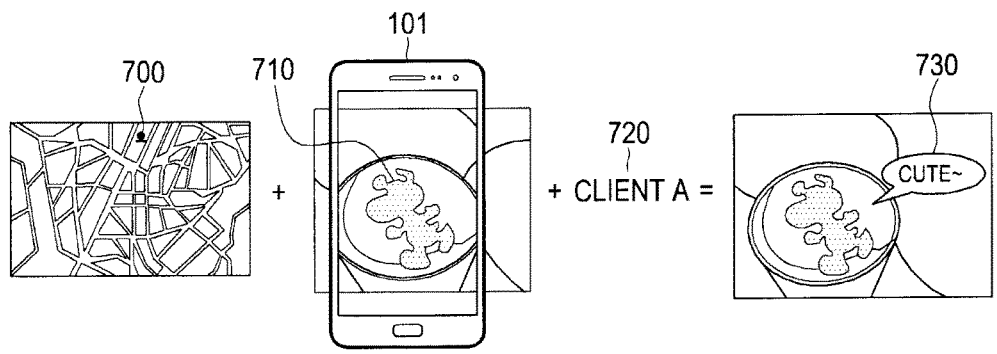
FIG. 7 is a diagram illustrating an example of partially matching virtual object provision according to various embodiments of the present disclosure.

For example, the first virtual object may have A-1 stored as the first condition 501, B-1 as the second condition 502, and C-1 as the third condition 503. To provide a more detailed example for aiding understanding of the present embodiment, as illustrated in FIG. 7, for example, the first condition may be a geographical position, the second condition may be an object detectable from a captured image, and the third condition may be user information.

Similarly, the second virtual object may have A-2 stored as the first condition 501, B-2 as the second condition 502, and C-2 as the third condition 503; the third virtual object may have A-3 stored as the first condition 501, B-3 as the second condition 502, and C-3 as the third condition 503; and the $N^{th}$ virtual object may have A-N stored as the first condition 501, B-N as the second condition 502, and C-N as the third condition 503.

Therefore, when a plurality of conditions is received, including a first condition 501 of A-1, a second condition 502 of B-1, and a third condition 503 of C-1 with a request for a virtual object, a first virtual object matching all of the three conditions, may be searched for and provided if found. Similarly, when a plurality of conditions is received including a first condition 501 of A-2, a second condition 502 of B-2, and a third condition 503 of C-2, requesting a virtual object is requested, a second virtual object which coincides with all of the three conditions may be retrieved and provided. When any of the plurality of conditions is not satisfied, it may be determined that there is no fully coinciding or matching virtual object, meaning that no virtual object may be provided. However, in these cases when there exists a partially matching virtual objet, which partially coincides with only some, rather than all the conditions, according to various embodiments of the present disclosure as described above, the corresponding partially matching virtual object may then be provided.

Figure 6:
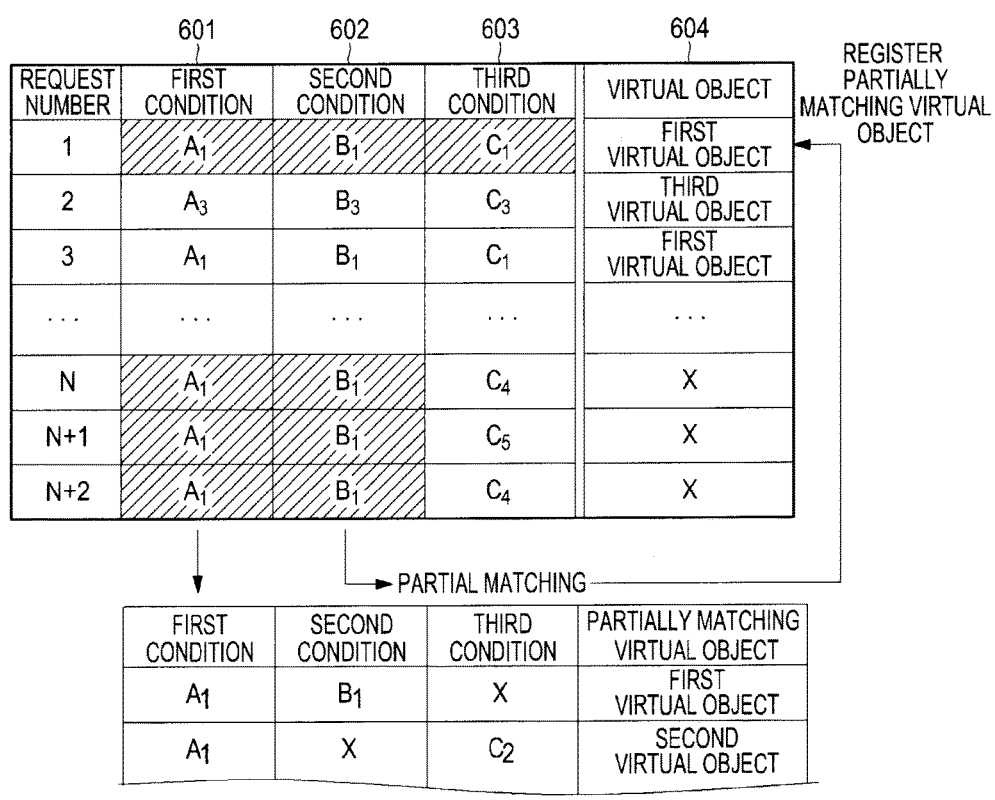
FIG. 6 is a diagram illustrating a partially matching virtual object configuration according to various embodiments of the present disclosure.

FIG. 6 is a diagram illustrating a partially matching virtual object configuration according to various embodiments of the present disclosure.

Referring to FIG. 6, when a plurality of conditions including a first condition 601 of A-1, a second condition 602 of B-1, and a third condition 603 of C-1 are received with a first request for a virtual object (as previously described with reference to FIG. 5), a first virtual object coinciding with all of the three conditions may be searched for and provided as the corresponding virtual object 604 when detected. When a plurality of conditions including a first condition 601 of A-3, a second condition 602 of B-3, and a third condition 603 of C-3 are received at a second request for a virtual object, a third virtual object matching or coinciding with all of the three conditions may be detected and provided as the corresponding virtual object 604. When a plurality of conditions including a first condition 601 of A-1, a second condition 602 of B-1, and a third condition 603 of C-1 are received at a third request and a virtual object is requested, a first virtual object, which matches or coincides with all of the three conditions, may be detected as the corresponding virtual object 604 and provided to the electronic device, as in the case of the first request.

According to various embodiments of the present disclosure, when a plurality of conditions including a first condition 601 of A-1, a second condition 602 of B-1, and a third condition 603 of C-4 are received at a $N^{th}$ request and a virtual object is requested, no virtual object exists that coincides with all of the three conditions, meaning no virtual object 604 may be provided. In addition, when a plurality of conditions including a first condition 601 of A-1, a second condition 602 of B-1, and a third condition 603 of C-5 are received at a $(N+1)^{th}$ request and a virtual object is requested, no virtual object exists that coincides with all of the three conditions, meaning no virtual object 604 may be provided. In addition, when a plurality of conditions including a first condition 601 of A-1, a second condition 602 of B-1, and a third condition 603 of C-4 are received at a $(N+2)^{th}$ request and a virtual object is requested, no virtual object exists that coincides with all of the three conditions, meaning no virtual object 604 may be provided.

Figure 8:
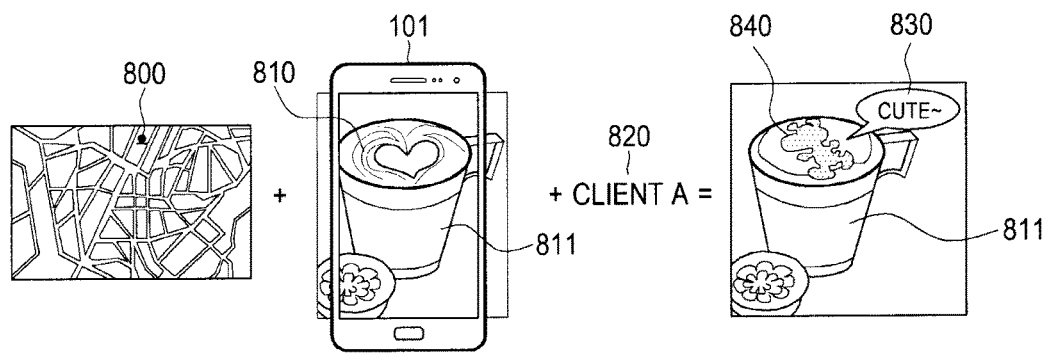
FIG. 8 is a diagram illustrating an example of partially matching virtual object provision according to various embodiments of the present disclosure.

According to various embodiments of the present disclosure, it may be determined that when the first condition 601 is A-1 and the second condition 602 is B-1 at the $N^{th}$ request, the $(N+1)^{th}$ request, and the $(N+2)^{th}$ request, the third condition 603 has been changed. For example, a position-based condition may be changed or an image-based condition may have been changed, as illustrated in FIG. 8. When the non-coinciding third condition 603 persists at least a predetermined number of times or a predetermined period of time as described above, a plurality of conditions having a first condition 601 of A-1, a second condition 602 of B-1, and a third condition 603 of C-1, which correspond to the first virtual object, may be set as partially matching conditions. In addition, a first virtual object, which satisfies the partially matching condition, may be thus be set as a partially matching virtual object.

When the first virtual object is set as a partially matching virtual object in this manner, the first virtual object may be provided at a request for a virtual object, even when the first and second conditions are satisfied but the third condition is not satisfied. Similarly, when the first condition is A-1, the third condition is C-2, and the second condition has been changed, a second virtual object, which has been set before the change of the second condition, may be set as a partially matching virtual object.

Hereinafter, various examples of displaying a partially matching virtual object in an electronic device according to various embodiments of the present disclosure will be described with reference to FIG. 7 to FIG. 9.

FIG. 7 is a diagram illustrating an example of partially matching virtual object provision according to various embodiments of the present disclosure. Referring to FIG. 7, client A 720 may use an electronic device 101 (e.g., a smartphone) at a specific time and generate an augmented reality word balloon 730 for a cartoon dog image for a coffee cup 710 in a geographic location Yeoksam-dong 700. At the specific time at which the virtual object (e.g., word balloon) has been generated, the client ID (e.g., client A 720), the geographic position (Yeoksam-dong 700), and the cartoon dog image on a coffee cup 710 may be a plurality of pieces of situational information or conditions corresponding to the relevant virtual object, i.e. word balloon 730.

According to various embodiments of the present disclosure, when one of the conditions from amount the client ID, the geographical position and the cartoon dog image 710 of the virtual object registered in FIG. 7 is changed, the virtual object registered in FIG. 7 may be registered as a partially matching virtual object so that, even when the conditions are partially satisfied, the virtual object may still be provided.

FIG. 8 is a diagram illustrating one example of partially matching virtual object provision according to various embodiments of the present disclosure. Referring to FIG. 8, client A 820 may utilize an electronic device 101 (e.g., a smartphone) which generates the augmented reality word balloon 830, as related to a coffee cup cartoon dog image 810 in Yeoksam-dong 800. The specific time at which the virtual object (e.g., the word balloon) has been generated, the client ID (e.g., "client A" 820), the position (Yeoksam-dong 800), and the coffee cup cartoon dog image 810 may be a plurality of pieces of situation information or conditions corresponding to the virtual object, i.e. word balloon 830.

According to various embodiments of the present disclosure, when at least one condition from among multiple conditions of a virtual object is changed, a virtual object (e.g. word balloon 830) may be displayed on the basis of one or more remaining condition that have not changed.

For example, even when less than all conditions are matched due to absence of the coffee cup cartoon dog image, the same virtual object (e.g., the word balloon 730) may be provided as the augmented reality image. For example, as in various embodiments of the present disclosure, even when coffee cup cartoon dog image has been changed or deleted from the plurality of conditions for displaying the virtual object, the virtual object (e.g., word balloon 830) may nevertheless be displayed on the basis of matching a portion or part of the plurality of conditions, which continue to correspond to the virtual object.

According to various embodiments of the present disclosure, client A may use the electronic device 101 to generate and utilize an additional object with regard to a partially matching virtual object. For example, client A may detect a partially matching virtual object from the electronic device 101 and generate a word balloon reading "cartoon dog café has moved to Cheongdam-dong", indicating, for example, that a cafe utilizing the cartoon logo has moved to another locale, and display relevant information indicating the new location, such as a map or street view of the new location. According to various embodiments of the present disclosure, client B, who desires information regarding the cartoon dog café may be provided with one or more generated virtual objects in augmented reality. Accordingly, a virtual object may be retrieved and display when conditions match a portion or part of the conditions usually designated for generation of the virtual object.

According to various embodiments of the present disclosure, a level (or step) may be set (or configured) with respect to a plurality of conditions of a virtual object, and some degree of displaying or generating the partially matching virtual object may be varied according to the degree of correlation between conditions at the point of time at which the virtual object corresponding to the plurality of conditions is first created, and conditions at a point of time at which the virtual object is generated and displayed to be viewed by a user.

For example, referring back to FIG. 7 and FIG. 8, a virtual object may be displayed and seen by a user. In this example, one of the plurality of conditions regarding the virtual object is the presence of a coffee cup cartoon dog image 710, which may have been set initially during initial generation of the virtual object. In the present example, all conditions are satisfied, except the image-related condition. Accordingly, different levels of partially matching virtual images may be displayed when the image is not a "coffee cup cartoon dog image" but is instead a "coffee cup image" or if an image is captured that has nothing to do with coffee cups. Thus, in this example, the above-mentioned security level (e.g., a step) may be used as a method for setting a plurality of levels of matching conditions controlling varying displays of a virtual object.

Thus, in this example, a virtual object is being generated and displayed, and one of the original plurality of conditions for generating the virtual object is a coffee cup cartoon dog image. In this case, it may be implemented that if all conditions other than the image condition are matched, a partially matching virtual object may be determined exist according to the security level set with regard to the plurality of conditions. In these cases, the partially matching virtual object may be displayed when information regarding the non-coinciding condition, i.e. the image, is inputted. For example, input of information regarding the non-coinciding condition (i.e. the image) may be made through a voice "coffee cup cartoon dog"; alternatively, the corresponding partially matching virtual object may be shown when the coffee image is searched for and inputted.

According to various embodiments of the present disclosure, implementation may be made such that, when a condition, which is related to an existing condition in connection with a specific part, is inputted with regard to some non-coinciding conditions among conditions for displaying a virtual object, the corresponding coinciding virtual object is displayed.

For example, when café associated with the cartoon dog has disappeared from the corresponding geographic position so that the coffee cup cartoon dog image 710, which is one of conditions of the virtual object in FIG. 7, has changed to a heart coffee image 810 in FIG. 8, the virtual object may be displayed on the changed real object, i.e. current preview image, as augmented reality on the basis of the remaining conditions of client ID 720 and position 700.

As illustrated in FIG. 8 as an embodiment of the method for displaying a virtual object, a condition of which has changed, the cartoon dog image, which has been one of conditions of the virtual object, may be overlapped and displayed on a currently taken image as still another virtual object.

According to various embodiments of the present disclosure, by means of a method capable of searching for a time line or time on the preview as still another embodiment of the method for displaying a virtual object having a changed condition, implementation may be made so that the changed condition, i.e. the time at which cartoon dog coffee had existed or at which the virtual object had been generated, is revisited to be displayed together with the virtual object.

According to various embodiments, a real object and a virtual object may be combined and stored or variously displayed.

For example, when the client has stored a virtual object as information, it may be inquired about when the client wants. In addition, when each condition includes images or position-related information, it may be expressed in a gallery type, for example.

Figure 9:
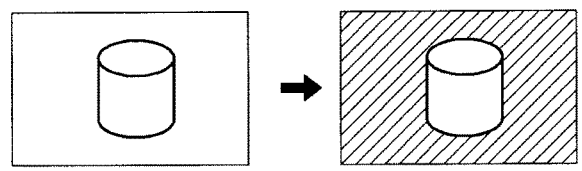
FIG. 9 is a diagram illustrating an example of matching a real object and a virtual object according to various embodiments of the present disclosure.

As illustrated in FIG. 9, according to another embodiment, an image at the time of image taking and a virtual object may be mapped and displayed on the screen of the electronic device. For example, according to various embodiments of the present disclosure, all conditions existing within the range of an image is displayed by the electronic device, and the user selects a condition, thereby displaying virtual objects that had not been visible at the time of image taking.

As still another embodiment of the method for displaying a virtual object having a changed condition, when a virtual object has been set as a background when generating augmented reality information, the background at the time of recognition of a real object may be changed to the background of the virtual object. For example, when a cartoon dog image has been recognized, and when a matching virtual object is used as a background at the time of generation of augmented reality information, the client can watch the cartoon dog image be displayed on the background at the time of generation of the augmented reality information even when café background, except for the cartoon dog image, is changed later.

In another embodiment of the method for displaying a virtual object having a changed condition, when the changed condition is a geographic position in FIG. 7 and FIG. 8, the virtual object or the virtual object and one of some conditions of the virtual object (e.g., the image) may be displayed on the map or the street view.

The method for providing a virtual object or a partially matching virtual object according to various embodiments of the present disclosure may provide the object inside an electronic device or through interworking with an external server, as described above. In addition, at least a part of the method for providing a virtual object or a partially matching virtual object may be performed inside an electronic device, and at least a part of the remainder may be performed through an external server. Hereinafter, an embodiment of a method for providing a virtual object or a partially matching virtual object by an external server will be described with reference to FIG. 10 and FIG. 11.

Figure 10:
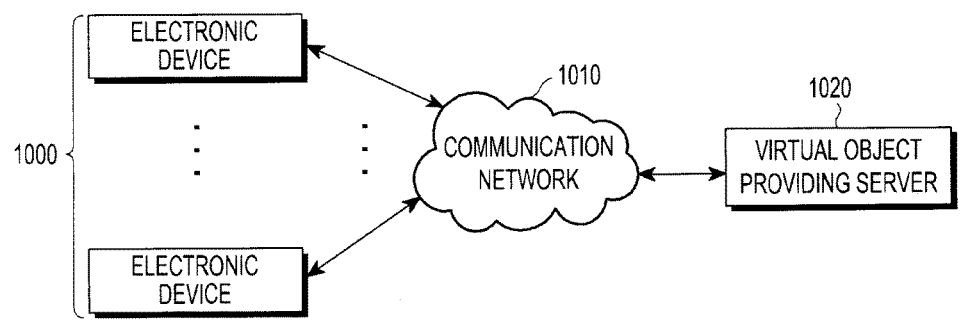
FIG. 10 illustrates a network environment including electric devices and a virtual object provision server according to various embodiments of the present disclosure.

FIG. 10 is a diagram illustrating a system according to various embodiments of the present disclosure. Referring to FIG. 10, a system according to an embodiment of the present disclosure may include at least one electronic device 1000 and a virtual object providing server 1020.

When an image is captured through a camera module provided on the electronic device 1000 according to an embodiment of the present disclosure, an object recognized from the captured image may be matched with a virtual object, thereby providing augmented reality. The virtual object may be an object stored in the electronic device 1000, or may be an object received from the virtual object providing server 1020 via a communication network 1010 at a request of the electronic device 1000.

For example, at least one real object is recognized from an image taken by the electronic device 1000, and a plurality of conditions (e.g., the geographical position of the electronic device 1000, the aiming direction, the aiming range, the aiming target, the aiming time, the degree of exposure to a different client, environmental conditions such as weather, client gestures, etc.) are transmitted to the virtual object providing server 1020 via the communication network 1010 to request a virtual object; then, the virtual object providing server 1020 may search the database for a virtual object matching with the plurality of conditions and provide the electronic device 1000 with the virtual object found. The electronic device 1000 may match (image synthesis or image overlay) the virtual object, which has been provided by the virtual object providing server 1020, with the currently taken image, thereby displaying augmented reality.

According to various embodiments of the present disclosure, recognition of a real object and collection of a plurality of conditions may be obtained by using multiple electronic devices 1000. For example, respective electronic devices 1000 may own different sensors or devices. For example, in order to configure complex conditions according to various embodiments, sensing information from multiple electronic devices may be delivered to each other through communication modules. As another embodiment, a server may receive in aggregate sensing information from multiple electronic devices, thereby configuring a plurality of conditions.

When there exists no virtual object, which matches with the plurality of conditions, in the virtual object server 1020, no virtual object could be provided. However, according to an embodiments of the present disclosure, a virtual object matching with at least one of the plurality of conditions is provided to the electronic device 1000, thereby providing the client with various useful information.

Although it has been assumed in the above description with reference to FIG. 10 that the electronic device 1000 requests the virtual object providing server 1020 to provide a virtual object and then receives the same, a virtual object matching with a plurality of conditions may be searched through a storage unit inside the electronic device 1000 and then displayed, as described above.

The communication network 1010 may be configured irrespective of an aspect of communication such as wired/wireless communication, and may be configured as various communication networks including a Personal Area Network (PAN), a Local Area Network (LAN), a Metropolitan Area Network (MAN), a Wide Area Network (WAN) and the like. Further, the communication network 1010 may be a known World Wide Web (WWW), and may use a wireless transmission technology utilized for a short distance communication such as Infrared Data Association (IrDA) or Bluetooth. In addition, the communication network 1010 may include a cable broadcasting network for receiving broadcasting signals, a terrestrial broadcasting communication network, a satellite broadcasting communication network, etc.

Figure 11:
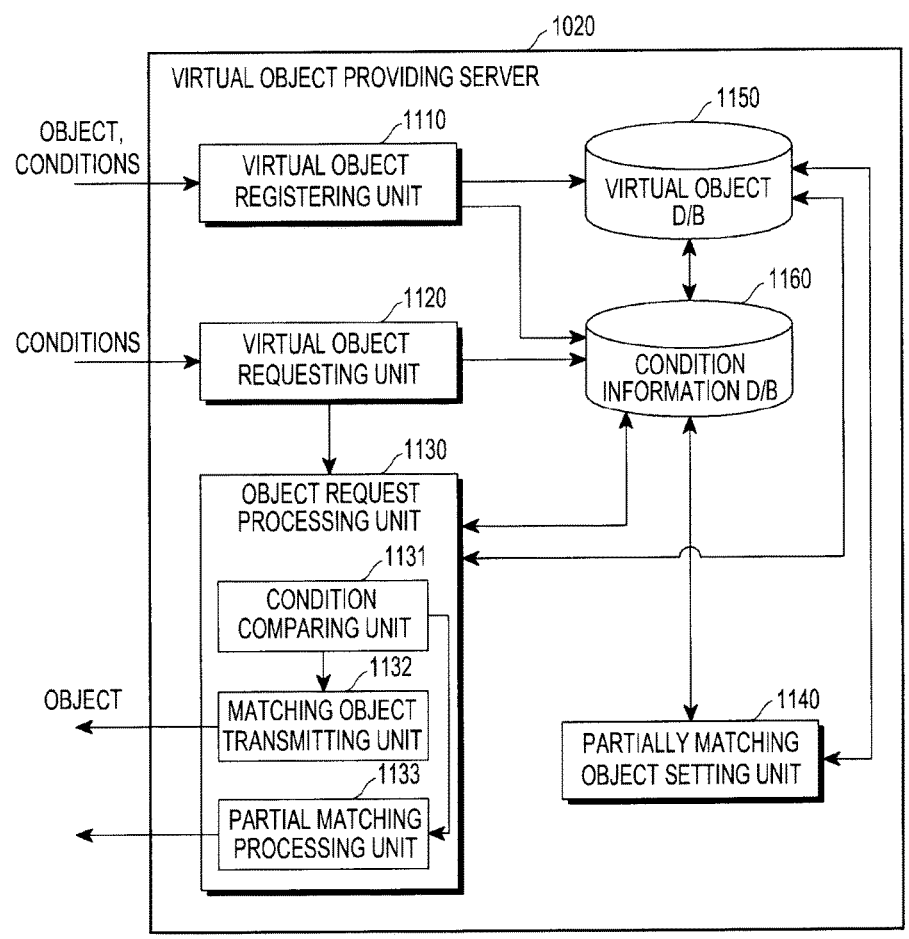
FIG. 11 is a block diagram illustrating a virtual object provision server according to various embodiments of the present disclosure.

FIG. 11 is a diagram illustrating a detailed configuration of a virtual object providing server according to various embodiments of the present disclosure. Referring to FIG. 11, the virtual object providing server 1020 may include a virtual object registering unit 1110, a virtual object requesting unit 1120, an object request processing unit 1130, a partially matching virtual object setting unit 1140, etc. In addition, according to an embodiment of the present disclosure, the virtual object providing server 1020 may further include a database such as a virtual object database 1150 and a condition information database 1160.

The virtual object registering unit 1110 may perform a function of storing at least one virtual object for implementing augmented reality, which corresponds to a plurality of conditions, in a database. Each of the virtual objects to be registered may be stored in the virtual object database 1150 so as to correspond to a plurality of conditions (e.g., two or more conditions). In this case, the plurality of conditions may be separately stored in the condition information database 1160 and managed, in order to set a partially matching virtual object.

At a request for virtual object registration from each electronic device 1000, the virtual object registering unit 1110 may receive the corresponding virtual object and a plurality of conditions and register them, or the virtual object providing server 1020 may directly register them.

The virtual object requesting unit 1120, as described with reference to FIG. 10, receives a plurality of conditions from the electronic device 1000 and, when a matching virtual object is requested, sends a request for the virtual object to the object request processing unit 1130 according to the request. In this case, the plurality of conditions requested may be stored in the condition information database 1160.

The object request processing unit 1130 may include a condition comparing unit 1131, a matching object transmitting unit 1132, a partial matching processing unit 1133, etc. The condition comparing unit 1131 performs a function of comparing conditions, which have been received according to the request for a virtual object through the virtual object requesting unit 1120, with a plurality of conditions corresponding to each virtual object stored in the virtual object database 1150.

The matching object transmitting unit 1132 transmits a virtual object, all conditions of which coincide with the received conditions as a result of comparison by the condition comparing unit 1131, to the corresponding electronic device 1000 as a matching object.

When there exists no virtual object, all conditions of which coincide with the plurality of conditions received, in the virtual object database 1150 as a result of comparison by the condition comparing unit 1131, it may be determined whether a virtual object exists or not which satisfies at least one condition. When a virtual object exists that satisfies at least one condition as a result of the determination, the partially matching processing unit 1133 may transmit the corresponding object to the electronic device 1000 as a partially matching virtual object. In addition, when the plurality of conditions received satisfy a preset partially matching condition, preset partially matching processing may be performed according to another embodiment of the present disclosure. Various embodiments in this regard will be described later.

The partially matching virtual object setting unit 1140 performs a function of setting a virtual object, among virtual objects stored, which satisfies a specific condition, as a partially matching virtual object according to an embodiment of the present disclosure. Assuming, for example, that, among a plurality of conditions matching with each virtual object stored in the virtual object database 1150 according to an embodiment of the present disclosure, conditions having a specific non-coinciding condition are repeatedly received over a predetermined period of time; then, the corresponding virtual object may be set as a partially matching virtual object. Accordingly, when the plurality of conditions received from the electronic device 1000 satisfy the partially matching condition of the partially matching virtual object, the partially matching processing unit 1133 may provide the electronic device 1000 with the corresponding partially matching virtual object.

Accordingly, even when a specific condition is changed (e.g., change of a position or an image, among a plurality of conditions) so that no virtual object exists which satisfies the entire conditions, the electronic device 1000 can provide a related virtual object as a partially matching virtual object, thereby providing the client with more diversified pieces of information.

A virtual object providing server according to one of various embodiments of the present disclosure may include: a virtual object registering unit configured to store at least one virtual object for augmented reality so as to correspond to a plurality of conditions; a virtual object requesting unit configured to receive a plurality of conditions from an electronic device and request a search for a virtual object; and an object request processing unit configured to search for a virtual object, which satisfies the plurality of conditions received from the electronic device, from among the stored virtual objects and, when no virtual object exists that satisfies all of the plurality of received conditions, transmit a virtual object, which satisfies at least one of the plurality of received conditions, to the electronic device.

According to various embodiments, the object request processing unit may include a condition comparing unit configured to compare the plurality of received conditions with a plurality of conditions corresponding to a stored virtual object; and a partially matching object setting unit configured to determine, when at least one condition does not coincide as a result of the comparison, whether the non-coinciding condition persists or not and, when it is determined as a result of the determination that the non-coinciding condition has persisted at least for a preset period of time, register at least one coinciding condition from among the plurality of conditions, in connection with which the non-coinciding condition has persisted, as a partially matching condition; and the object request processing unit may provide the electronic device with the virtual object when the plurality of conditions received from the electronic device satisfy the partially matching condition.

Figure 12:
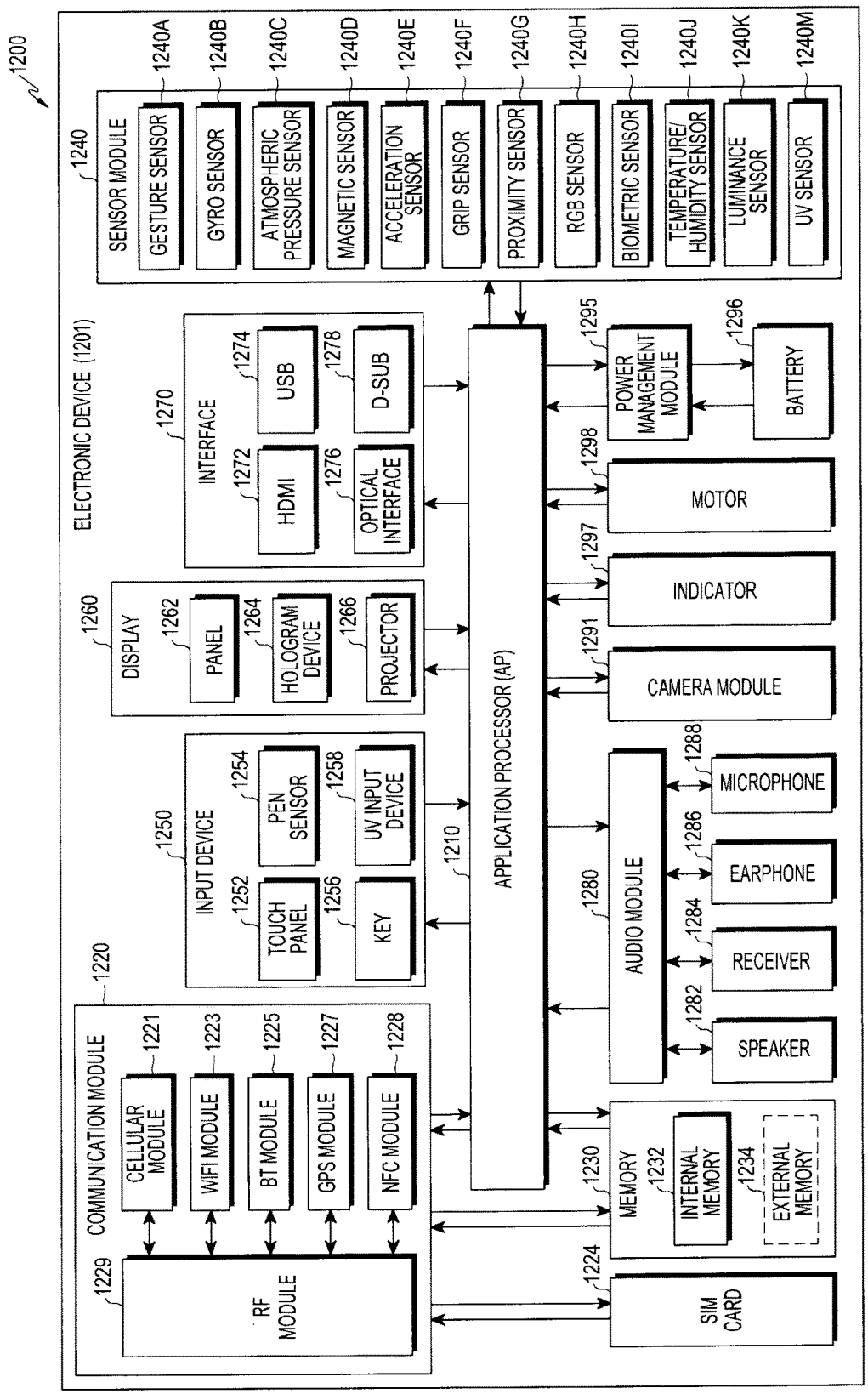
FIG. 12 is a block diagram illustrating a detailed configuration of an electric device according to various embodiments of the present disclosure.

Hereinafter, an example detailed structure of an electronic device, to which embodiments of the present disclosure may be applied, will be described with reference to FIG. 12. FIG. 12 illustrates a block diagram 1200 of an electronic device 1201 according to various embodiments. The electronic device 1201 may include, for example, all or a part of the electronic device 101 shown in FIG. 1. Referring to FIG. 12, the electronic device 1201 may include at least one application processor (AP) 1210, a communication module 1220, a Subscriber Identification Module (SIM) card 1224, a memory 1230, a sensor module 1240, an input device 1250, a display 1260, an interface 1270, an audio module 1280, a camera module 1291, a power management module 1295, a battery 1296, an indicator 1297, and a motor 1298.

The AP 1210 may control multiple hardware or software components connected to the AP 1210 by driving an operating system or an application program, process various data including multimedia data, and perform calculations. The AP 1210 may be embodied as, for example, a System on Chip (SoC). According to an embodiment, the AP 1210 may further include a graphic processing unit (GPU) (not shown).

The communication module 1220 (for example, the communication interface 160) may perform data transmission/reception in communication between the electronic device 1201 (for example, the electronic device 101) and other electronic devices (for example, the electronic device 104 and the server 106) connected over a network. According to an embodiment, the communication module 1220 may include a cellular module 1221, a WiFi module 1223, a BT module 1225, a GPS module 1227, an NFC module 1228, and a radio frequency (RF) module 1229.

The cellular module 1221 may provide a voice call, a video call, a message service, or an internet service through a communication network (for example, LTE, LTE-A, CDMA, WCDMA, UMTS, WiBro, GSM, or the like). Also, the cellular module 1221 may identify and authenticate an electronic device in a communication network using, for example, a subscriber identification module (for example, the SIM card 1224). According to an embodiment, the cellular module 1221 may perform at least a part of functions that may be provided by the AP 1210. For example, the cellular module 1221 may perform at least a part of a multimedia control function.

According to an embodiment, the cellular module 1221 may include a communication processor (CP). In addition, for example, the cellular module 1221 may be implemented as a System on Chip (SOC). In FIG. 12, the component elements such as the cellular module 1221 (e.g., a communication processor), the memory 1230, the power management module 1295, and the like are separated with the AP 1210, but, according to an embodiment, the AP 1210 may include at least a part of the above-mentioned component elements (e.g., the cellular module 1221).

According to an embodiment, the AP 1210 or the cellular module 1221 (e.g., the communication processor) may load a command or data received from at least one of a non-volatile memory and other elements connected thereto into a volatile memory and process the loaded command or data. Further, the AP 1210 or the cellular module 1221 may store data received from or generated by at least one of the other components in a non-volatile memory.

Each of the Wi-Fi module 1223, the BT module 1225, the GPS module 1227, and the NFC module 1228 may include, for example, a processor for processing data transmitted/received through the corresponding module. In FIG. 16, the cellular module 1221, the WiFi module 1223, the BT module 1225, the GPS module 1227, and the NFC module 1228 are illustrated as blocks separated from one another, but at least a part (for example, two or more) of the cellular module 1221, the WiFi module 1223, the BT module 1225, the GPS module 1227, and the NFC module 1228 may be included in one Integrated Chip (IC) or one IC package according to an embodiment. For example, at least a part (for example, a communication processor corresponding to the cellular module 1221 and a Wi-Fi processor corresponding to the Wi-Fi module 1223) of the processors corresponding to the cellular module 1221, the Wi-Fi module 1223, the BT module 1225, the GPS module 1227, and the NFC module 1228, respectively, may be implemented as a single SoC.

The RF module 1229 may transmit/receive data, for example, an RF signal. Although not illustrated, the RF module 1229 may include, for example, a transceiver, a Power Amp Module (PAM), a frequency filter, a Low Noise Amplifier (LNA), or the like. Further, the RF unit 1229 may further include a component for transmitting/receiving an electromagnetic wave in the air in a radio communication, such as a conductor or a conducting wire. Although FIG. 16 shows that the cellular module 1221, the WiFi module 1223, the BT module 1225, the GPS module 1227, and the NFC module 1228 share one RF module 1229, at least one of the cellular module 1221, the WiFi module 1223, the BT module 1225, the GPS module 1227, and the NFC module 1228 may perform RF signal transmission/reception through a separate RF module.

The SIM card 1224 may be a card including a subscriber identification module, and may be inserted into a slot formed in a particular portion of the electronic device. The SIM card 1224 may include unique identification information (for example, Integrated Circuit Card IDentifier (ICCID)) or subscriber information (for example, International Mobile Subscriber Identity (IMSI)).

The memory 1230 (for example, the memory 130) may include an internal memory 1232 or an external memory 1234. The internal memory 1232 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, and the like).

According to one embodiment, the internal memory 1232 may be a Solid State Drive (SSD). The external memory 1234 may further include a flash drive, for example, a Compact Flash (CF), a Secure Digital (SD), a Micro Secure Digital (Micro-SD), a Mini Secure Digital (Mini-SD), an eXtreme Digital (xD), a memory stick, or the like. The external memory 1234 may be functionally connected to the electronic device 1201 through various interfaces. According to an embodiment, the electronic device 1201 may further include a storage device (or storage medium) such as a hard drive.

The sensor module 1240 may measure a physical quantity or detect an operation state of the electronic device 1201, and may convert the measured or detected information to an electronic signal. The sensor module 1240 may include, for example, at least one of a gesture sensor 1240A, a gyro sensor 1240B, an atmospheric pressure sensor 1240C, a magnetic sensor 1240D, an acceleration sensor 1240E, a grip sensor 1240F, a proximity sensor 1240G, a color sensor 1240H (e.g., a Red, Green, Blue (RGB) sensor), a biometric sensor 1240I, a temperature/humidity sensor 1240J, a luminance sensor 1240K, and an ultraviolet (UV) sensor 1240M. Additionally or alternatively, the sensor module 1240 may include, for example, an E-nose sensor (not illustrated), an ElectroMyoGraphy (EMG) sensor (not illustrated), an ElectroEncephaloGram (EEG) sensor (not illustrated), an ElectroCardioGram (ECG) sensor (not illustrated), an InfraRed (IR) sensor (not illustrated), an iris sensor (not illustrated), a fingerprint sensor (not illustrated) and the like. The sensor module 1240 may further include a control circuit for controlling one or more sensors included therein.

The input device 1250 may include a touch panel 1252, a (digital) pen sensor 1254, a key 1256, or an ultrasonic input device 1258. The touch panel 1252 may recognize a touch input through at least one of, for example, a capacitive scheme, a resistive scheme, an infrared scheme, and an ultrasonic scheme. The touch panel 1252 may further include a control circuit. The capacitive scheme touch panel may recognize physical contact or proximity. The touch panel 1252 may further include a tactile layer. In this case, the touch panel 1252 may provide a tactile reaction to the client.

The (digital) pen sensor 1254 may be embodied, for example, using a method identical or similar to a method of receiving a touch input of a client, or using a separate recognition sheet. The key 1256 may include, for example, a physical button, an optical key or a keypad. The ultrasonic input device 1258 is a device which can detect an acoustic wave by a microphone (for example, a microphone 1288) of the electronic device 1201 through an input tool generating an ultrasonic signal to identify data, and can perform wireless recognition. According to an embodiment, the electronic device 1201 may also receive a client input from an external device (e.g., a computer or a server) connected thereto by using the communication module 1220.

The display 1260 (for example, the display 150) may include a panel 1262, a hologram device 1264, or a projector 1266. The panel 1262 may be, for example, a Liquid Crystal Display (LCD), Active-Matrix Organic Light Emitting Diode (AM-OLED), or the like. The panel 1262 may be embodied to be, for example, flexible, transparent, or wearable. The panel 1262 may be also configured as one module together with the touch panel 1252. The hologram device 1264 may show a stereoscopic image in the air by using interference of light. The projector 1266 may project light onto a screen to display an image. For example, the screen may be located inside or outside the electronic device 1201. According to an embodiment, the display 1260 may further include a control circuit for controlling the panel 1262, the hologram unit 1264, or the projector 1266.

The interface 1270 may include, for example, a High-Definition Multimedia Interface (HDMI) 1272, a Universal Serial Bus (USB) 1274, an optical interface 1276, or a D-subminiature (D-sub) 1278. The interface 1270 may be included in, for example, the communication interface 160 illustrated in FIG. 1. Additionally or alternatively, the interface 1270 may include, for example, a Mobile High-definition Link (MHL) interface, a Secure Digital (SD) card/Multi-Media Card (MMC) interface, or an Infrared Data Association (IrDA) standard interface.

The audio module 1280 may bidirectionally convert a sound and an electronic signal. At least some components of the audio module 1280 may be included in, for example, the input/output interface 140 illustrated in FIG. 1. The audio module 1280 may process voice information input or output through, for example, a speaker 1282, a receiver 1284, earphones 1286, the microphone 1288 or the like.

The camera module 1291 is a device that can take still and moving images, and according to an embodiment, may include one or more image sensors (e.g., a front sensor or a rear sensor), a lens (not shown), an Image Signal Processor (ISP) (not shown), or a flash (e.g., an LED or a xenon lamp, not shown).

The power management module 1295 may manage power of the electronic device 1201. Although not illustrated, the power management module 1295 may include, for example, a Power Management Integrated Circuit (PMIC), a charger Integrated Circuit (IC), or a battery or fuel gauge.

The PMIC may be mounted to, for example, an integrated circuit or an SoC semiconductor. Charging methods may be classified into a wired charging method and a wireless charging method. The charger IC may charge a battery and prevent over voltage or over current from being flowed from a charger. According to an embodiment, the charger IC may include a charger IC for at least one of the wired charging and the wireless charging. A magnetic resonance scheme, a magnetic induction scheme, or an electromagnetic scheme may be exemplified as the wireless charging method, and an additional circuit for wireless charging, such as a coil loop circuit, a resonance circuit, a rectifier circuit, and the like may be added.

The battery fuel gauge may measure, for example, the remaining amount of the battery 1296, a charging voltage and current, or temperature. The battery 1296 may store or generate electricity, and may supply power to the electronic device 1201 using the stored or generated electricity. The battery 1296 may include, for example, a rechargeable battery or a solar battery.

The indicator 1297 may display a particular state of the electronic device 1201 or a part thereof (for example, the AP 1210), for example, a boot-up state, a message state, a charging state, or the like. The motor 1298 may convert an electrical signal to a mechanical vibration. Although not shown, the electronic device 1201 may include a processing unit (e.g., a GPU) for supporting a mobile TV function. The processing unit for supporting the mobile TV may process media data according to a standard of Digital Multimedia Broadcasting (DMB), Digital Video Broadcasting (DVB), media flow or the like.

Each of the components of the electronic device according to the present disclosure may be implemented by one or more components and the name of the corresponding component may vary depending on a type of the electronic device. The hardware 200 according to an embodiment of the present disclosure may include at least one of the above-described elements. Some of the above-described elements may be omitted from the hardware 200, or the hardware 200 may further include additional elements. Further, some of the components of the electronic device according to the present disclosure may be combined to be one entity, which can perform the same functions as those of the components before the combination.

The term "module" used in the present disclosure may refer to, for example, a unit including one or more combinations of hardware, software, and firmware. The "module" may be interchangeable with a term, such as a unit, a logic, a logical block, a component, or a circuit. The "module" may be the smallest unit of an integrated component or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. When the command is executed by one or more processors (for example, the processor 120), the one or more processors may execute a function corresponding to the command. The computer-readable storage medium may be, for example, the memory 130. At least some of the programming modules may be implemented (for example, executed) by, for example, the processor 120. At least a part of the programming module may include, for example, a module, a program, a routine, a set of instructions and/or a process for performing one or more functions.

The computer readable recoding medium may include magnetic media, such as a hard disk, a floppy disk and a magnetic tape, optical media, such as a Compact Disc Read Only Memory (CD-ROM) and a Digital Versatile Disc (DVD), magneto-optical media, such as a floptical disk, and a hardware device specially configured to store and execute a program instruction (for example, a programming module), such as a Read Only Memory (ROM), a Random Access Memory (RAM), a flash memory, and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments, a storage medium storing commands is provided, the commands being set to perform, when executed by at least one processor, at least one operation by the at least one processor, and the at least one operation may include: an operation of confirming a plurality of conditions; an operation of searching for a virtual object, which satisfies the plurality of conditions, from among at least one virtual object; and an operation of providing a virtual object, which satisfies at least one of the plurality of condition, when no virtual object exists that satisfies the plurality of conditions as a result of the search. In addition, different embodiments of various embodiments of the present disclosure may be possible.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan understands and appreciates that a "processor" or "microprocessor" includes hardware in the disclosure. Under the broadest reasonable interpretation, the appended claims include statutory subject matter in compliance with 35 U.S.C. § 101.

The embodiments of the present disclosure disclosed in this specification and the accompanying drawings are merely particular examples provided in order to clearly describe the technical contents of the present disclosure and help understanding of the present disclosure, and are not intended to limit the scope of the present disclosure. Therefore, all changes or modifications derived from the technical idea of the present disclosure as well as the embodiments described herein should be interpreted to belong to the scope of the present disclosure.

What is claimed is:

1. A method for providing a virtual object, the method comprising:
    receiving a request for a virtual object including a first condition set comprising a plurality of present conditions;
    searching a database for the virtual object by comparing each of the plurality of present conditions to each of a plurality of conditions included in a plurality of condition sets, each set associated with at least one virtual object stored in the database;
    in response to none of the plurality of condition sets having the plurality of conditions matching all of the plurality of present conditions, determining one or more first conditions among the plurality of present conditions coinciding with one or more second conditions included in one of the plurality of condition sets;
    in response to the coincidence between the one or more first conditions and the one or more second conditions being repeated a predetermined times, registering the one or more first conditions as a partially matching condition set; and
    providing a partially matching virtual object corresponding to the partially matching condition set.

2. The method of claim 1, further comprising associating the at least one virtual object to a condition set including a stored plurality of conditions.

3. The method of claim 2, further comprising:
    comparing the plurality of present conditions with the stored plurality of conditions associated with the virtual object;
    in response to at least one condition of the plurality of present conditions being not matched with any of the stored plurality of conditions according to the comparison, detecting whether the non-matching at least one condition persists for a predetermined time period;
    in response to the non-matching at least one condition being persisted for the predetermined period time, registering the non-matching at least one condition as a partially matching condition; and
    providing the partially matching virtual object corresponding to the partially matching condition in response to the plurality of present conditions being matched with the partially matching condition.

4. The method of claim 1, wherein the providing the partially matching virtual object comprises generating and displaying the partially matching virtual object as an image on a screen of an electronic device.

5. The method of claim 1, further comprising:
    providing an image-type virtual object in response to the non-matching at least one condition being an image; and
    displaying the virtual object on a changed portion of an image displayed on a screen.

6. The method of claim 1, wherein the virtual object is at least one of a still image, a moving image, a sound, a smell, a touch, a temperature, and a position.

7. The method of claim 1, wherein the plurality of present conditions include at least one of a geographical position of an electronic device, an aim direction of a camera of the electronic device, an aiming range of the camera, an aiming target of the camera, an aiming time of the camera, a degree of exposure of the camera, a weather of an environment of the electronic device, and a user gesture detected by the electronic device.

8. An electronic device for providing a virtual object, the electronic device comprising:
a memory; and
a processor, configured to:
receive a request for the virtual object including a first condition set comprising a plurality of present conditions,
execute a search for the virtual object by comparing each of the plurality of present conditions to each of a plurality of conditions included in a plurality of condition sets, each set associated with at least one virtual object stored in the memory,
when none of the plurality of condition sets having the plurality of conditions matching all of the plurality of present conditions, determine one or more first conditions among the received plurality of present conditions coinciding with one or more second conditions included in one of the plurality of condition sets,
when the coincidence between the one or more first conditions and the one or more second conditions is repeated a predetermined times, register the one or more first conditions as a partially matching condition set, and
provide a partially matching virtual object corresponding to the partially matching condition set.

9. The electronic device of claim 8, the processor further configured to associate the at least one virtual object to a condition set including a stored plurality of conditions.

10. The electronic device of claim 9, wherein the processor is further configured to:
compare the plurality of present conditions with the stored plurality of conditions associated with the virtual object;
when the comparison indicates at least one condition of the plurality of present conditions does not match any of the stored plurality of conditions, detect whether the non-matching at least one condition persists for a predetermined time period;
when the non-matching at least one condition persists for the predetermined time period, register the non-matching at least one condition as a partially matching condition; and
provide the partially matching virtual object corresponding to the partially matching condition when the plurality of present conditions match the partially matching condition.

11. The electronic device of claim 8, further comprising a display, the processor further configured to:
generate and display the partially matching virtual object as an image on the display.

12. The electronic device of claim 8, wherein the processor is further configured to:
process, when the non-matching at least one condition is an image, so as to display the virtual object on a changed portion of an image displayed on a screen of the electronic device.

13. The electronic device of claim 8, wherein the virtual object includes at least one of a still image, a moving image, a sound, a smell, a touch, a temperature, and a position.

14. The electronic device of claim 8, wherein the plurality of present conditions include at least one of a geographical position of the electronic device, an aim direction of a camera of the electronic device, an aiming range of the camera, an aiming target of the camera, an aiming time of the camera, a degree of exposure of the camera, a weather of an environment of the electronic device, and a user gesture detected by the electronic device.

15. A non-transitory computer-readable recording medium in which a program for executing the method of claim 1 on a computer is recorded.

16. A method for providing a virtual object in an electronic device, the method comprising:
requesting a virtual object by transmitting a plurality of present conditions detected by the electronic device to a server, the server having a memory for a plurality of condition sets;
receiving a virtual object from the server; and
generating and displaying the received virtual object as an image on a screen of the electronic device,
wherein in response to none of the plurality of condition sets having a plurality of conditions matching all of the plurality of present conditions, the received virtual object is identified as a second virtual object associated with a partially matching condition set, the partially matching condition set including one or more second conditions among the plurality of present conditions which coincide with one or more third conditions included in one of the plurality of condition sets, and the one or more second conditions being registered by the server as the partially matching condition set in response to a coincidence between the one or more second conditions and the one or more third conditions being repeated a predetermined time.

17. The method of claim 16, wherein the virtual object is at least one of a still image, a moving image, a sound, a smell, a touch, a temperature, and a position.

18. The method of claim 16, wherein the plurality of present conditions include at least one of a geographical position of the electronic device, an aim direction of a camera of the electronic device, an aiming range of the camera, an aiming target of the camera, an aiming time of the camera, a degree of exposure of the camera, a weather of an environment of the electronic device, and a user gesture detected by the electronic device.

19. A virtual object providing server comprising:
a memory; and
a processor, configured to:
store at least one virtual object for augmented reality associated with a plurality of conditions;
receive a request for the virtual object including a first condition set comprising a plurality of present conditions from an external electronic device;
execute a search the memory for the virtual object by comparing each of the plurality of present conditions to each of the plurality of conditions included in a plurality of condition sets, each set associated with at least one virtual object stored in the memory;
when none of the plurality of condition sets has the plurality of conditions matching all of the plurality of present conditions, determine one or more first conditions among the plurality of present conditions coinciding with one or more second conditions included in one of the plurality of condition sets;
when the coincidence between the one or more first conditions and the one or more second conditions is repeated a predetermined times, register the one or more first conditions as a partially matching condition set; and
transmit to the electronic device a partially matching virtual object corresponding to the partially matching condition set.

20. The virtual object providing server of claim 19, wherein the processor is further configured to:

detect the partially matching condition set which has one or more conditions matching at least one of the plurality of present conditions; and when the partially matching condition set is not stored in a database, determine whether the coincidence between the one or more first conditions and the one or more second conditions is repeated a predetermined times.

\* \* \* \* \*